(12) United States Patent
Bonic

(10) Patent No.: US 12,100,077 B2
(45) Date of Patent: Sep. 24, 2024

(54) VISUAL DATABASE SYSTEM FOR MULTIDIMENSIONAL DATA REPRESENTATION

(71) Applicant: RED HAT, INC., Raleigh, NC (US)

(72) Inventor: Sanja Bonic, Vienna (AT)

(73) Assignee: Red Hat, Inc., Raleigh, NC (US)

( * ) Notice: Subject to any disclaimer, the term of this patent is extended or adjusted under 35 U.S.C. 154(b) by 223 days.

(21) Appl. No.: 17/736,210

(22) Filed: May 4, 2022

(65) Prior Publication Data

US 2023/0360292 A1    Nov. 9, 2023

(51) Int. Cl.
G06T 11/20 (2006.01)
G06F 16/44 (2019.01)
G06T 15/00 (2011.01)

(52) U.S. Cl.
CPC .......... *G06T 11/206* (2013.01); *G06F 16/444* (2019.01); *G06T 15/00* (2013.01)

(58) Field of Classification Search
CPC ...... G06T 11/206; G06T 15/00; G06F 16/444
See application file for complete search history.

(56) References Cited

U.S. PATENT DOCUMENTS

| | | | |
|---|---|---|---|
| 6,611,825 B1 | 8/2003 | Billheimer et al. | |
| 7,265,755 B2 | 9/2007 | Peterson | |
| 7,660,823 B2 | 2/2010 | Clover | |
| 9,135,314 B2 | 9/2015 | Armitage | |
| 10,417,812 B2 | 9/2019 | Djorgovski et al. | |
| 2015/0278334 A1* | 10/2015 | Gerweck | G06F 16/283 707/706 |
| 2017/0193688 A1* | 7/2017 | Djorgovski | G06T 15/205 |

FOREIGN PATENT DOCUMENTS

CN          106599234 A      4/2017

OTHER PUBLICATIONS

Daniel Marsh, "Introduction to computer graphics", Apr. 26, 2021, https://www.splento.com/blog/photography/introduction-to-computer-graphics (Year: 2021).*
Hu et al., "VizML: A Machine Learning Approach to Visualization Recommendation," CHI 2019, May 4-9, 2019, Glasgow, Scotland, UK, pp. 1-12.
Gumelar et al., "An Anatomy of Machine Learning Data Visualization," 2019 International Seminar on Application for Technology of Information and Communication (Semantic), 2019, pp. 82-87.

* cited by examiner

*Primary Examiner* — Michelle L Sams
(74) *Attorney, Agent, or Firm* — Kilpatrick Townsend & StocktonLLP

(57) ABSTRACT

A visual database system can represent multidimensional data. For example, a computing system can receive, by a visual database system, a multidimensional data point having a plurality of features. The computing system can generate a visual representation of the multidimensional data point by mapping the plurality of features of the multidimensional data point to a plurality of visual attributes using a mapping table associated with the visual database system. The computing system can store, by the visual database system, the visual representation of the multidimensional data point in a visual format. The computing system can output the visual representation to a graphical user interface of a client device for subsequent processing.

20 Claims, 4 Drawing Sheets

VISUAL DATABASE SYSTEM FOR MULTIDIMENSIONAL DATA REPRESENTATION

TECHNICAL FIELD

The present disclosure relates generally to database systems. More specifically, but not by way of limitation, this disclosure relates to a visual database system for multidimensional data representation.

BACKGROUND

Data may be prepared differently depending on whether a computer system is going to process the data or a human is going to process the data. For example, data that is for human consumption may be represented visually rather than textually. But, data that is to be processed by a computer system may be represented textually rather than visually. In addition, data analysis techniques, such as machine-learning models, may require data to be extensively preprocessed into a specific format. So, a data storage technique that stores data in a way that is usable by both humans and computer systems with minimal manipulation may be desirable.

DETAILED DESCRIPTION

Figure 1:
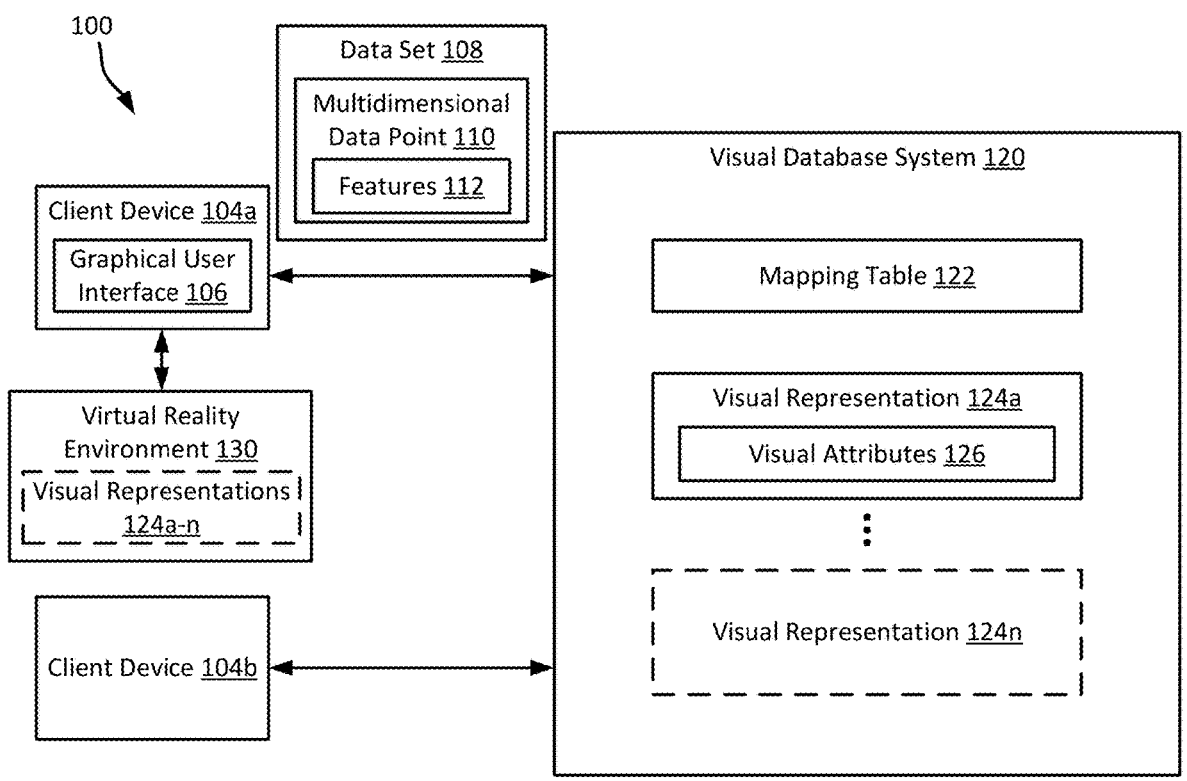
FIG. 1 is a block diagram of an example of a system for implementing a visual database system for multidimensional data representation according to some aspects of the present disclosure.

Humans often process information that is presented visually easier than information that is presented textually. But, computing devices are typically better at processing textual information. Due to this mismatch, data is often transformed between visual information and textual information using various software depending on how the data is to be consumed or used. In addition, machine-learning models may need data to be prepared in a specific way, which can lead to redundant storage of large amounts of data. As such, researchers and developers often need extended periods of time to adapt a machine-learning model to a specific set of data. Thus, extensive computing resources are typically involved in preparing and using data.

Some examples of the present disclosure can overcome one or more of the abovementioned problems by providing a system that can implement a visual database system that represents multidimensional data. The system can receive, by a visual database system, a multidimensional data point having multiple features. The system can generate a visual representation of the multidimensional data point by mapping the features of the multidimensional data point to visual attributes using a mapping table associated with the visual database system. The system can store, by the visual database system, the visual representation of the multidimensional data point in a visual format. The system can then output the visual representation to a graphical user interface (GUI) of a client device for subsequent processing. Thus, the data may be in a usable format for machine-learning models or other downstream processing, thereby reducing computing resources involved in preparing, storing, and using data.

One particular example can involve a system that receives multidimensional data points associated with computing nodes. The multidimensional data points can include features of CPU usage, memory load, and a physical location for each of the computing nodes. The system can generate a vector graphic for each multidimensional data point, and the vector graphics can include visual attributes that correspond to the features. A mapping table of a visual database system can associate a feature that indicates a high CPU usage (e.g., greater than 70%) with a visual attribute of a cat and a feature that indicates a node is working under a high memory load (e.g., greater than 65%) with a visual attribute of a dog. The vector graphics can be input to a machine-learning model trained to identify cats and dogs. The machine-learning model can then generate an output indicating which vector graphics include both cats and dogs. Based on the output, it can be determined which nodes are experiencing both a high CPU usage and a high memory load, since each vector graphic that includes a cat and a dog corresponds to a node that is experiencing both a high CPU usage and a high memory load.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing a visual database system for multidimensional data representation according to some aspects of the present disclosure. The system 100 can include client devices 104a-b, and the visual database system 120. Examples of the client devices 104a-b can include a desktop computer, a laptop, a mobile phone, server, etc. The client devices 104a-b and the visual database system 120 can communicate over a network, such as a local area network (LAN) or the Internet.

In some examples, the visual database system 120 may be located in a server that is in communication with the client devices 104a-b. The visual database system 120 can receive a multidimensional data point 110 from the client device 104a. The multidimensional data point may be a data point of a data set 108, where each data point of the data set 108 has a set of features 112. For instance, the multidimensional data point 110 may be a data point of the data set 108 that includes information about computing nodes of a cluster, and the features 112 can be characteristics of the computing node. Examples of the features 112 may be a CPU usage, a memory load, a location of the computing node, applications running on the computing node, etc.

The visual database system 120 can receive the multidimensional data point 110 and determine a visual representation 124a of the multidimensional data point 110 using a mapping table 122. The mapping table 122 can associate each feature of the features 112 with a visual attribute for the visual representation 124a. The visual representation 124a may be a two-dimensional output, such as a vector graphic or a rasterized image, or a three-dimensional output, such as a virtual reality output. As an example, the visual representation 124*a* may be a vector graphic, so the mapping table 122 can map each feature to various attributes, or elements, of the vector graphic, such as a background color, foreground shapes and associated colors, etc. So, if the multidimensional data point 110 represents a computing node, the mapping table 122 may associate the CPU-usage feature with a background color, the memory-load feature with a color of a circle in the foreground, and the location with a shape of a green visual attribute in the foreground. The result of using the mapping table 122 is the visual representation 124*a* with visual attributes 126.

The mapping table 122 used by the visual database system 120 may differ depending on from which of the client devices 104*a-b* the multidimensional data point 110 is received. That is, each of the client devices 104*a-b* may be associated with a different mapping table. Users associated with the client devices 104*a-b* can generate the different mapping tables, which can be stored locally at the client devices 104*a-b*. The client device 104*a-b* may send the mapping table that is to be used for the generation of the visual representation 124*a* along with the multidimensional data point 110, or at a different time. As such, the visual representation 124*a* generated by the visual database system 120 using the mapping table 122 may be different than a visual representation generated by the visual database system 120 if the visual database system uses a mapping table received from the client device 104*b*.

The mapping table 122 can include identifiers that are associated with the visual attributes 126. The identifiers can correspond to the visual representation 124*a*, so the identifiers can be summarized into the visual representation 124*a*. In some examples, the mapping table 122 may be a hash table to increase efficiency. In such examples, the visual representation 124*a* can be associated with a hash key that is an identifier (ID) of the visual representation 124*a*. The hash table can also include values associated with the visual attributes 126 with ID suffixes for the visual representation 124*a*. For example, if the data set 108 includes multidimensional data points about books in a library, each visual representation corresponding to a multidimensional data point can have a hash key identifying the visual representation and values with ID suffixes for the features (e.g., author, title, genre, language, etc.) of the book. As a particular example, the ID suffix for an author last name may be "ID-a-last", the ID suffix for a title may be "ID-title", the ID suffix for a language may be "ID-language", etc.

In some examples, the visual database system 120 receives the data set 108 of multidimensional data points and generates the visual representation 124*a*, which includes the visual attributes 126 associated with the features 112 of each multidimensional data point of the data set 108. For instance, the visual representation 124*a* can be a vector graphic or rasterized image, and each multidimensional data point can be associated with a defined portion of coordinates or visual features of the vector graphic or the rasterized image. So, each defined portion of coordinates can include the visual attributes of the corresponding multidimensional data point.

Alternatively, the visual database system 120 may receive the data set 108 of multidimensional data points and generate the visual representations 124*a-n*, each of which including visual attributes associated with the features 112 of a particular multidimensional data point of the data set 108. For instance, the visual representation 124*a* can be a vector graphic or rasterized image representing the multidimensional data point 110 and the visual representation 124*n* can be another vector graphic or rasterized image representing another multidimensional data point of the data set 108.

Upon generating the visual representation 124*a*, the visual database system 120 stores the visual representation 124*a* in a visual format. For instance, if the visual representation 124*a* is a vector graphic, the visual database system 120 may store the visual representation 124*a* in a scalable vector graphic (SVG) format. Alternatively, if the visual representation 124*a* is a rasterized image, the visual database system 120 may store the visual representation 124*a* in a Joint Photographic Experts Group (JPEG), Portable Network Graphics (PNG), or graphics interchange format (GIF) format. The visual format can be defined by a configuration of the visual database 120.

At some point in time the client device 104*a* may access the visual database system 120 so that the visual representation 124*a*, or the visual representations 124*a-n*, is output to a GUI 106 of the client device 104*a*. The GUI 106 can display the visual representations 124*a-n* in the visual format or a different visual format, and a user can analyze the visual representations 124*a-n* to identify desired information. The visual representations 124*a-n* may be sorted based on a particular visual attribute prior to being displayed at the GUI 106. For instance, the user may indicate that the visual representations 124*a-n* are to be sorted according to CPU-usage, so the GUI 106 can display the visual representations 124*a-n* with visual attributes 126 that are associated with a high CPU-usage (e.g., greater than 50%) in a first location of the GUI 106 and the visual representations 124*a-n* with visual attributes 126 that are associated with a low CPU-usage (e.g., less than 50%) in a second location of the GUI 106.

To determine the sorting, the visual database system 120 can identify the ID suffix associated with the sorting criteria and then sort the values based on the ID suffix. For instance, to sort books based on an author last name, the visual database system 120 can identify the ID suffix of "ID-a-last" for each visual representation and then sort the values of the "ID-a-last" suffix alphabetically. The visual database system 120 can then output the sorted visual representations for display at the GUI 106.

The output of the visual representations 124*a-n* may also be used as an input to a machine-learning model that is trained for object classification. Since the visual representations 124*a-n* are normalized, the machine-learning model can receive the visual representations 124*a-n* without additional pre-processing being applied to the visual representations 124*a-n*. An output of the machine-learning model can include an indication of a particular object in the visual representations 124*a-n*. The object can correspond to a visual attribute that is associated with a feature of a multidimensional data point. For instance, the machine-learning model may be trained to identify a blue background of a vector graphic, in which a visual attribute of background color corresponds to a genre of a book. The machine-learning model can output an indication that the visual representation 124*a* includes the blue background. As a result, it can be determined that the book associated with the visual representation 124*a* is science fiction, based on the mapping table 122 associating the genre of science fiction with a blue background.

In examples that involve inputting the visual representations 124*a-n* into a machine-learning model, mapping tables received from the client devices 104*a-n* can be replaced by a pipeline using algorithm-optimized objects. That is, rather than including user-defined associations between the features 112 and the visual attributes 126, the mapping table 122 can include associations between the features 112 and visual attributes on which the machine-learning model is trained to detect. So, the visual attributes 126 used by the mapping table 122 can be tuned to a specific machine-learning model, which can allow for various experimentation and correlation research as well as simplified data generation. Since the mapping table 122 provides direct translations to visual attributes 126, the visual representations 124a-n can allow for unbiased algorithmic investigation.

As a particular example, the mapping table 122 may generate the visual representations 124a-n as 100×100 pixel SVG files or rasterized images for each multidimensional data point of the data set 108. The visual database system 120 can be a matrix collage of the visual representations 124a-n. The multidimensional data points can be associated with computing nodes and the visual representations 124a-n can include visual attributes 126 representing features 112 of the computing nodes. The mapping table 122 can associate a feature that indicates a node is failing with a visual attribute of a cat and a feature that indicates a node is working under a certain load with a visual attribute of a dog. The mapping table 122 can associate a feature that indicates a node is close to sending an alarm with a visual attribute of a bird. The visual representations 124a-n with the visual attributes 126 generated by the mapping table 122 can be input to a machine-learning model trained to identify birds. The machine-learning model can then generate an output indicating which visual representations include birds. Based on the output, it can be determined which nodes are close to sending an alarm, since each visual representation of a bird corresponds to a node that is close to sending an alarm. An action can then be taken, either automatically or by a user, to reduce a likelihood of the nodes sending the alarm.

In some examples, outputting the visual representations 124a-n may involve rendering a virtual reality environment 130 that includes one or more of the visual representations 124a-n. The virtual reality environment 130 may display the visual representations 124a-n according to aspects of the mapping table 122. As a particular example, the mapping table 122 may associate working clusters of nodes with a low CPU and memory usage with a position behind a user in the virtual reality environment 130. In addition, clusters of nodes with a 90% CPU usage that are likely to soon send an alarm can be associated with a position to the left of the user in the virtual reality environment 130, whereas clusters of nodes that have shut down entirely can be associated with a position directly in front of the user in the virtual reality environment 130 and clusters of nodes that are restarting can be associated with a position to the right of the user in the virtual reality environment 130. The mapping table 122 can be configured so that CPU usage is the first sorting criterion and memory usage the second, which, in the mapping table 122, can mean that the CPU usage sorting translates to horizontal positioning in the virtual reality environment 130 and memory usage is closer to the position of the user. In this example, a node that has a 90% CPU usage and 50% memory load can be a few feet in front of the user, whereas a 90% CPU usage with a 90% memory load can be a few inches from the user. In this way, the user can quickly spot the nodes that are soon going to fail without having to click through menus, dashboards, and filtering criteria.

FIG. 1 is illustrative and non-limiting. Other examples may include more components, fewer components, different components, or a different arrangement of the components shown in FIG. 1. For example, although the system 100 includes two client devices and one visual database system in the example of FIG. 1, the system 100 may include a larger number of client devices and visual database systems in other examples. In addition, although features of a multidimensional data point are described as corresponding to visual attributes in FIG. 1, the mapping table could additionally or alternatively include other sensory attributes, such as olfactory attributes and auditory attributes, that correspond to the features.

Figure 2:
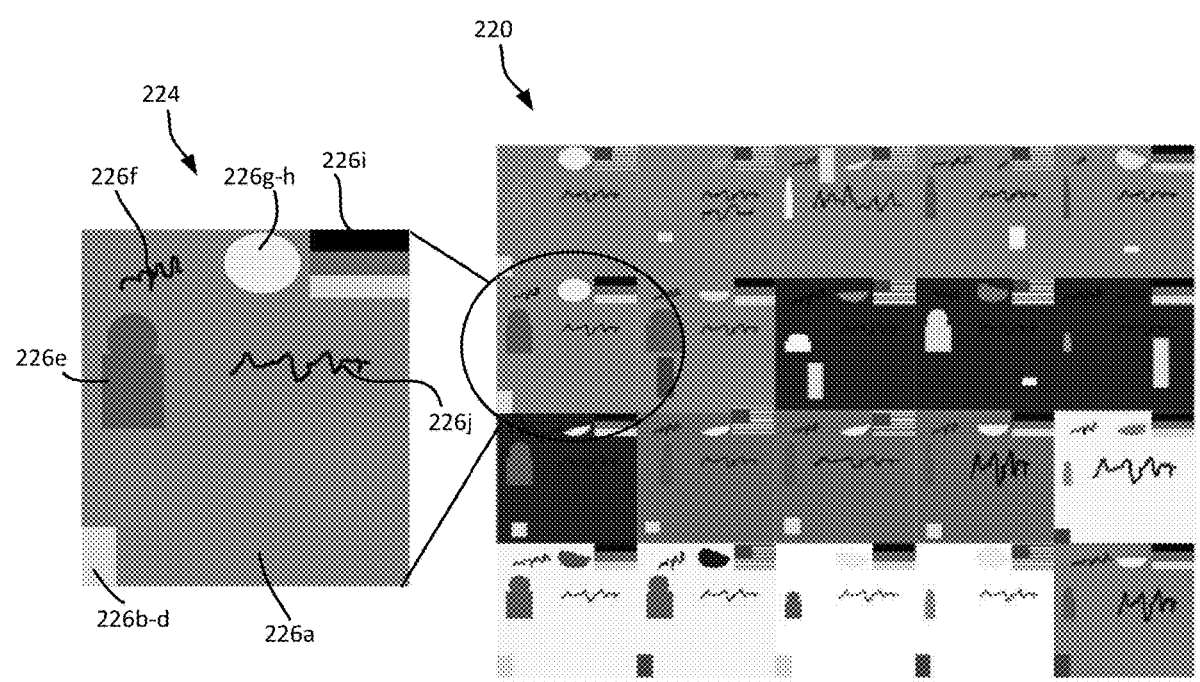
FIG. 2 is a diagram of an example of a visual database system of multidimensional data according to some aspects of the present disclosure.

FIG. 2 is a diagram of an example of a visual database system 220 of multidimensional data according to some aspects of the present disclosure. As illustrated in FIG. 2, the visual database system 220 includes a visual representation, represented as a vector graphic, for each multidimensional data point of a data set. In other examples, the visual database system 220 may be a single visual representation with defined coordinates for each multidimensional data point. The visual database system 220 is associated with a library inventory of twenty books, represented as a 5×4 matrix-shaped collage of vector graphics. Each vector graphic represents features of the books as visual attributes, as defined by a mapping table. For instance, the author is represented by a sphere and square in one shape with a color of the sphere and square signifying the gender of the author, the title is represented by a simplified polyline or text, the publisher is represented by a rectangle in various colors, and the publication date is represented by a moon-type shape with a color of the moon representing a year and a moon phase representing the month. The moon shape may be fine-tuned to represent days of the month. In addition, the genre is represented by a background color of the vector graphic, the language is represented by flag colors, which are three rectangles on top of each other. The international standard book number (ISBN) is represented by a simplified polyline or a dot. Different colors may signify a similarity in ISBN parts and an absence of the polyline or dot may signify that the multidimensional data point does not represent a book. Additionally, the number of pages is represented by a height of the rectangle. The shelf ID is represented by a position of the rectangle in the vector graphic that allows for immediate visualization of the location.

As one particular example, the visual database system 220 includes vector graphic 224, which is a visual representation of one book in the library inventory. The vector graphic 224 includes visual attributes 226a-j based on a mapping table. Visual attribute 226a is a background texture representing a fiction genre, visual attributes 226b-d are a height, color, and position of a rectangle representing a publisher, a number of pages greater than five hundred, and a location on a bottom shelf, respectively. In addition, visual attribute 226e represents a male author, visual attribute 226f is a polyline representing the ISBN, visual attribute 226g-h is a texture and moon phase representing a publication date of December 2010, visual attribute 226i is a textured rectangle representing the language is German, and visual attribute 226j is a polyline representing the title.

Although only twenty books are represented in the visual database system 220, other examples may involve a larger number of books, or other multidimensional data points, for example a library inventory of 10,000 books, which can be represented as a 100×100 matrix-shaped collage of SVGs. The ordering of SVGs can be chosen depending on user filtering. If the user sorts the whole library inventory by authors, the user can be presented a 100×100 matrix representing the entirety of the library inventory and the proportion of authors can be immediately visible. If the user is looking at the genre, the user may see an immediate clustering, rather than needing to analyze 10,000 rows of text lines. With this type of matrix, the user can quickly see that there are, for example, 1,000 astronomy books with an equal distribution of authors where most books were published in a certain data range, but they are separately stored on various shelves. It becomes simpler to recognize correlations between new things and be less biased. This approach may be useful when searching for the newest papers on a specific topic while reducing the user's search bias.

Figure 3:
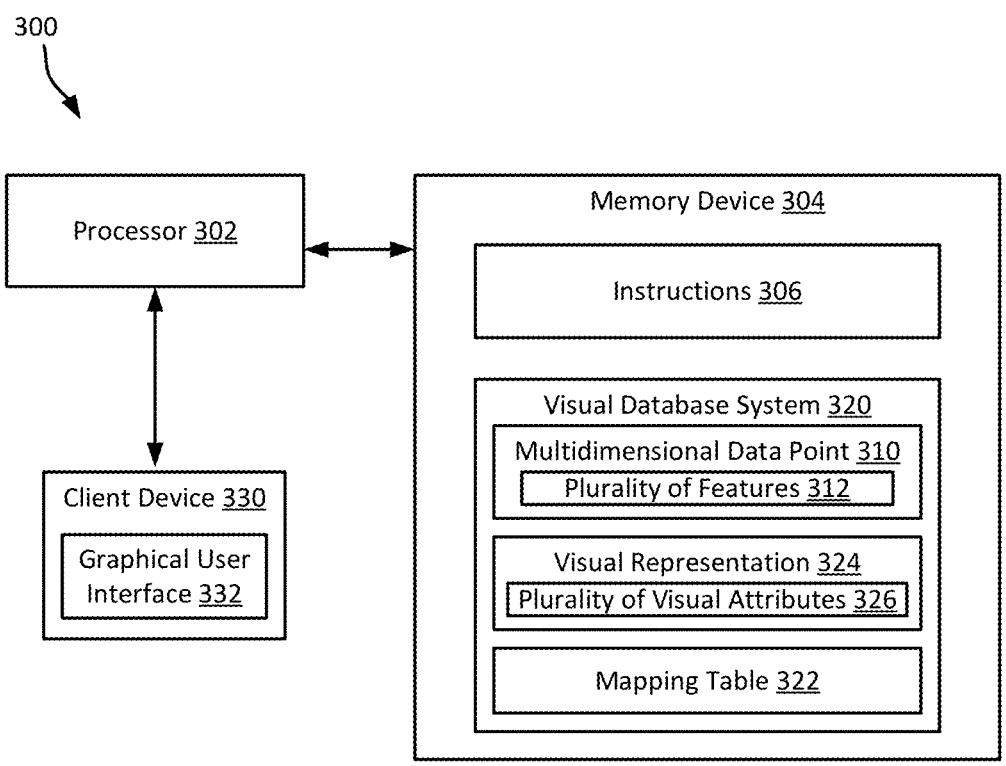
FIG. 3 is a block diagram of another example of a system for implementing a visual database system for multidimensional data representation according to some aspects of the present disclosure.

FIG. 3 is a block diagram of another example of a system 300 for implementing a visual database system for multidimensional data representation according to some aspects of the present disclosure. The system 300 includes a processor 302, which may be part of a server, such as a server that includes visual database system 120 in FIG. 1.

In this example, the processor 302 is communicatively coupled with a memory device 304. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory device 304 to perform operations. The instructions 306 can include processor-specific instructions generated by a compiler or an interpreter from code written in any suitable computer-programming language, such as C, C++, C #, etc.

The memory device 304 can include one memory or multiple memories. Non-limiting examples of the memory device 304 can include electrically erasable and programmable read-only memory (EEPROM), flash memory, or any other type of non-volatile memory. At least some of the memory device 304 includes a non-transitory computer-readable medium from which the processor 302 can read the instructions 306. The non-transitory computer-readable medium can include electronic, optical, magnetic, or other storage devices capable of providing the processor 302 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 306.

In some examples, the processor 302 can execute the instructions 306 to perform operations. For example, the processor 302 can receive, by a visual database system 320, a multidimensional data point 310 having a plurality of features 312. The processor 302 can generate a visual representation 324 of the multidimensional data point 310 by mapping the plurality of features 312 of the multidimensional data point 310 to a plurality of visual attributes 326 using a mapping table 322 associated with the visual database system 320. The processor 302 can store, by the visual database system 320, the visual representation 324 of the multidimensional data point 310 in a visual format. The processor 302 can then output the visual representation 324 to a GUI 332 of a client device 330 for subsequent processing. The subsequent processing may involve inputting the visual representation 324 to a machine-learning model trained for object detection, where an object corresponds to a visual attribute of the visual representation 324. Additionally or alternatively, the subsequent processing may involve rendering a virtual reality environment that includes the visual representation 324.

Figure 4:
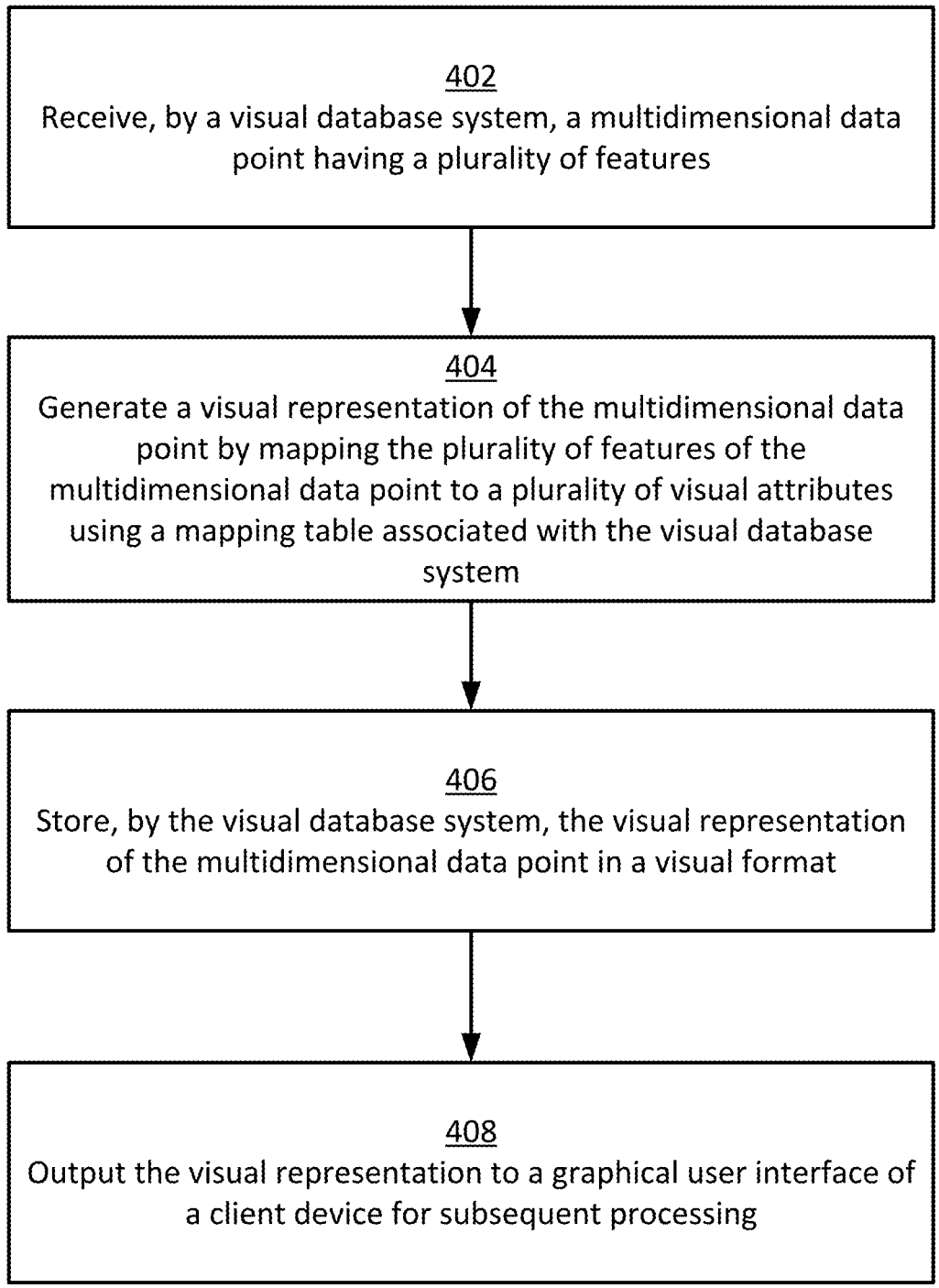
FIG. 4 is a flow chart of a process for implementing a visual database system for multidimensional data representation according to some aspects of the present disclosure.

The processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, the processor 302 can receive, by a visual database system 320, a multidimensional data point 310 having a plurality of features 312. The plurality of features 312 can be characteristics of the multidimensional data point 310. The processor 302 may receive the multidimensional data point 310 as one of a plurality of multidimensional data points. The plurality of multidimensional data points can be a data set of any type of information, and each multidimensional data point can include the plurality of features 312.

In block 404, the processor 302 can generate a visual representation 324 of the multidimensional data point 310 by mapping the plurality of features 312 of the multidimensional data point 310 to a plurality of visual attributes 326 using a mapping table 322 associated with the visual database system 320. The mapping table 322 may be associated with a user and received from a client device. The mapping table 222 can associate each feature of the plurality of features 312 with a visual attribute for the visual representation 324. The visual representation 324 may be a two-dimensional output, such as a vector graphic or a rasterized image, or a three-dimensional output, such as a virtual reality output. The mapping table 322 may be a hash table that includes, for the visual representation 324, a hash key that is an ID of the visual representation 324 and values associated with the plurality of visual attributes 326 with ID suffixes.

For the plurality of multidimensional data points, the processor 302 may generate the visual representation 324 to include the plurality of visual attributes 326 associated with the plurality of features 312 of each multidimensional data point of the plurality of multidimensional data points. For instance, the visual representation 324 can be a vector graphic or rasterized image, and each multidimensional data point can be associated with a defined portion of coordinates of the vector graphic or rasterized image. Alternatively, the visual database system 320 may receive the plurality of multidimensional data points and generate a different visual representation for each of the multidimensional data point. For instance, the visual representation 324 can be a vector graphic or rasterized image representing the multidimensional data point 310, and the processor 302 can generate another vector graphic or rasterized image representing another multidimensional data point of the plurality of multidimensional data points.

In block 406, the processor 302 can store, by the visual database system 320, the visual representation 324 of the multidimensional data point 310 in a visual format. For instance, if the visual representation 324 is a vector graphic, the visual database system 320 may store the visual representation 324 in a SVG format, or, if the visual representation 324 is a rasterized image, the visual database system 320 may store the visual representation 324 in a JPEG, PNG, or GIF format.

In block 408, the processor 302 can output the visual representation 324 to a GUI 332 of a client device 330 for subsequent processing. The subsequent processing may involve inputting the visual representation 324 to a machine-learning model trained for object detection, where an object corresponds to a visual attribute of the visual representation 324. Additionally or alternatively, the subsequent processing may involve rendering a virtual reality environment that includes the visual representation 324.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
   a processor; and
   a memory device including instructions that are executable by the processor for causing the processor to:
   receive, by a visual database system, a multidimensional data point having a plurality of features;
   generate an image corresponding to a visual representation of the multidimensional data point by mapping the plurality of features of the multidimensional data point to a plurality of visual attributes using a mapping table associated with the visual database system;
   store, by the visual database system, the image corresponding to the multidimensional data point in a visual format; and
   output the image to a graphical user interface of a client device for subsequent processing using a machine-learning model.

2. The system of claim 1, wherein the memory device further includes instructions that are executable by the processor for causing the processor to:
   receive the mapping table from a first client device, wherein the mapping table is a first mapping table that is different than a second mapping table that is receivable from a second client device.

3. The system of claim 1, wherein the memory device further includes instructions that are executable by the processor for causing the processor to:
   receive a plurality of multidimensional data points including the multidimensional data point and each having the plurality of features; and
   generate the image corresponding to the visual representation of the plurality of multidimensional data points by mapping the plurality of features of the plurality of multidimensional data points to the plurality of visual attributes using the mapping table, the image being a vector graphic or a rasterized image; and
   store the vector graphic or the rasterized image, wherein each multidimensional data point is associated with a defined portion of coordinates or visual features of the vector graphic or the rasterized image.

4. The system of claim 1, wherein the memory device further includes instructions that are executable by the processor for causing the processor to:
   receive a plurality of multidimensional data points including the multidimensional data point and each having the plurality of features;
   generate a plurality of images corresponding to a plurality of visual representations of the plurality of multidimensional data points by mapping the plurality of features of the plurality of multidimensional data points to the plurality of visual attributes using the mapping table, each image of the plurality of images being a vector graphic of a plurality of vector graphics or a rasterized image of a plurality of rasterized images; and
   store the plurality of images, wherein each multidimensional data point is associated with different vector graphic of the plurality of vector graphics or a different rasterized image of the plurality of rasterized images.

5. The system of claim 1, wherein the memory device further includes instructions that are executable by the processor for causing the processor to:
   output the image for subsequent processing involving rendering a virtual reality environment including the visual representation.

6. The system of claim 1, wherein the memory device further includes instructions that are executable by the processor for causing the processor to:
   output the image for subsequent processing using the machine-learning model by:
   inputting the image to the machine-learning model for object classification; and
   receiving an output from the machine-learning model of an indication of an object in the image, the object corresponding to a visual attribute of the plurality of visual attributes that is associated with a feature of the plurality of features of the multidimensional data point.

7. The system of claim 1, wherein the mapping table comprises a plurality of identifiers associated with the plurality of visual attributes, wherein the plurality of identifiers correspond to the visual representation.

8. A method comprising:
   receiving, by a visual database system, a multidimensional data point having a plurality of features;
   generating an image corresponding to a visual representation of the multidimensional data point by mapping the plurality of features of the multidimensional data point to a plurality of visual attributes using a mapping table associated with the visual database system;
   storing, by the visual database system, the image corresponding to the multidimensional data point in a visual format; and
   outputting the image to a graphical user interface of a client device for subsequent processing using a machine-learning model.

9. The method of claim 8, further comprising:
   receiving the mapping table from a first client device, wherein the mapping table is a first mapping table that is different than a second mapping table that is receivable from a second client device.

10. The method of claim 8, further comprising:
    receiving a plurality of multidimensional data points including the multidimensional data point and each having the plurality of features; and
    generating the image corresponding to the visual representation of the plurality of multidimensional data points by mapping the plurality of features of the plurality of multidimensional data points to the plurality of visual attributes using the mapping table, the image being a vector graphic or a rasterized image; and
    storing the vector graphic or the rasterized image, wherein each multidimensional data point is associated with a defined portion of coordinates or visual features of the vector graphic or the rasterized image.

11. The method of claim 8, further comprising:
    receiving a plurality of multidimensional data points including the multidimensional data point and each having the plurality of features;
    generating a plurality of images corresponding to a plurality of visual representations of the plurality of multidimensional data points by mapping the plurality of features of the plurality of multidimensional data points to the plurality of visual attributes using the mapping table, each image of the plurality of images being a vector graphic of a plurality of vector graphics or a rasterized image of a plurality of rasterized images; and storing the plurality of images, wherein each multidimensional data point is associated with different vector graphic of the plurality of vector graphics or a different rasterized image of the plurality of rasterized images.

12. The method of claim 8, further comprising:

outputting the image for subsequent processing involving rendering a virtual reality environment including the visual representation.

13. The method of claim 8, further comprising:

outputting the image for subsequent processing using the machine-learning model by:
  inputting the image to the machine-learning model for object classification; and
  receiving an output from the machine-learning model of an indication of an object in the image, the object corresponding to a visual attribute of the plurality of visual attributes that is associated with a feature of the plurality of features of the multidimensional data point.

14. The method of claim 8, wherein the mapping table comprises a plurality of identifiers associated with the plurality of visual attributes, wherein the plurality of identifiers correspond to the visual representation.

15. A non-transitory computer-readable medium comprising program code that is executable by a processor for causing the processor to:

receive, by a visual database system, a multidimensional data point having a plurality of features;

generate an image corresponding to a visual representation of the multidimensional data point by mapping the plurality of features of the multidimensional data point to a plurality of visual attributes using a mapping table associated with the visual database system;

store, by the visual database system, the image corresponding to the multidimensional data point in a visual format; and output the image to a graphical user interface of a client device for subsequent processing using a machine-learning model.

16. The non-transitory computer-readable medium of claim 15, further comprising program code that is executable by the processor for causing the processor to:

receive the mapping table from a first client device, wherein the mapping table is a first mapping table that is different than a second mapping table that is receivable from a second client device.

17. The non-transitory computer-readable medium of claim 15, further comprising program code that is executable by the processor for causing the processor to:

receive a plurality of multidimensional data points including the multidimensional data point and each having the plurality of features; and generate the image corresponding to the visual representation of the plurality of multidimensional data points by mapping the plurality of features of the plurality of multidimensional data points to the plurality of visual attributes using the mapping table, the image being a vector graphic or a rasterized image; and store the vector graphic or the rasterized image, wherein each multidimensional data point is associated with a defined portion of coordinates or visual features of the vector graphic or the rasterized image.

18. The non-transitory computer-readable medium of claim 15, further comprising program code that is executable by the processor for causing the processor to:

receive a plurality of multidimensional data points including the multidimensional data point and each having the plurality of features;

generate a plurality of images corresponding to a plurality of visual representations of the plurality of multidimensional data points by mapping the plurality of features of the plurality of multidimensional data points to the plurality of visual attributes using the mapping table, each image of the plurality of images being a vector graphic of a plurality of vector graphics or a rasterized image of a plurality of rasterized images; and store the plurality of images, wherein each multidimensional data point is associated with different vector graphic of the plurality of vector graphics or a different rasterized image of the plurality of rasterized images.

19. The non-transitory computer-readable medium of claim 15, further comprising program code that is executable by the processor for causing the processor to:

output the image for subsequent processing involving rendering a virtual reality environment including the visual representation.

20. The non-transitory computer-readable medium of claim 15, further comprising program code that is executable by the processor for causing the processor to:

output the image for subsequent processing using the machine-learning model by:
  inputting the image to the machine-learning model for object classification; and
  receiving an output from the machine-learning model of an indication of an object in the image, the object corresponding to a visual attribute of the plurality of visual attributes that is associated with a feature of the plurality of features of the multidimensional data point.

* * * * *